(12) United States Patent
Amir et al.

(10) Patent No.: US 9,781,419 B2
(45) Date of Patent: *Oct. 3, 2017

(54) COMPRESSING IMAGE DATA

(71) Applicant: Hewlett-Packard Development Company, L.P., Houston, TX (US)

(72) Inventors: Gideon Amir, Nes Ziona (IL); Ruth Bergman, Haifa (IL); Gitit Ruckenstein, Haifa (IL); Doron Shaked, Haifa (IL)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/853,573

(22) Filed: Sep. 14, 2015

(65) Prior Publication Data

US 2016/0007021 A1    Jan. 7, 2016

Related U.S. Application Data

(63) Continuation of application No. 11/492,447, filed on Jul. 25, 2006, now Pat. No. 9,137,549.

(51) Int. Cl.
| | |
|---|---|
| *G06K 9/36* | (2006.01) |
| *H04N 19/119* | (2014.01) |
| *H04N 19/60* | (2014.01) |
| *H04N 19/91* | (2014.01) |
| *H04N 19/94* | (2014.01) |
| *H04N 19/136* | (2014.01) |
| *H04N 19/176* | (2014.01) |

(52) U.S. Cl.
CPC ......... *H04N 19/119* (2014.11); *H04N 19/136* (2014.11); *H04N 19/176* (2014.11); *H04N 19/60* (2014.11); *H04N 19/91* (2014.11); *H04N 19/94* (2014.11)

(58) Field of Classification Search
None
See application file for complete search history.

(56) References Cited

U.S. PATENT DOCUMENTS

| 6,141,446 A | 10/2000 | Boliek et al. |
| 2001/0043753 A1 | 11/2001 | Grohs et al. |
| 2003/0044064 A1 | 3/2003 | Obrador |
| 2003/0138158 A1 | 7/2003 | Schwartz |

OTHER PUBLICATIONS

Taubman, David. S. et al., "JPEG2000: Image Compression Fundamentals, Standards and Practice", Kluwer Academic Publishers, 2002.
Rabbani, Majid et al., "An Overview of the JPEG2000 Still Image Compression Standard", 2002.
Rajpoot, Nasir M. et al., "Progressive image coding using augmented zerotrees of wavelet coefficients", University of Warwick, Department of Computer Science, Sep. 18, 1998.
Karayiannis, Nicholaos B., "Split and merge codebook design algorithms for image compression", Journal of Electronic Imaging 9(4), Oct. 2000, pp. 509-520.
Delp, Edward et al., "Image Compression Using Block Truncation Coding", IEEE, 1979.

*Primary Examiner* — Mark Roz
(74) *Attorney, Agent, or Firm* — HP Inc. Patent Department

(57) ABSTRACT

Provided in an example is a method of compressing a digital image includes dividing the image into cells of constant physical size regardless of resolution of the image to produce cell data for each cell which defines content of the cell and compressing the cell data.

15 Claims, 4 Drawing Sheets

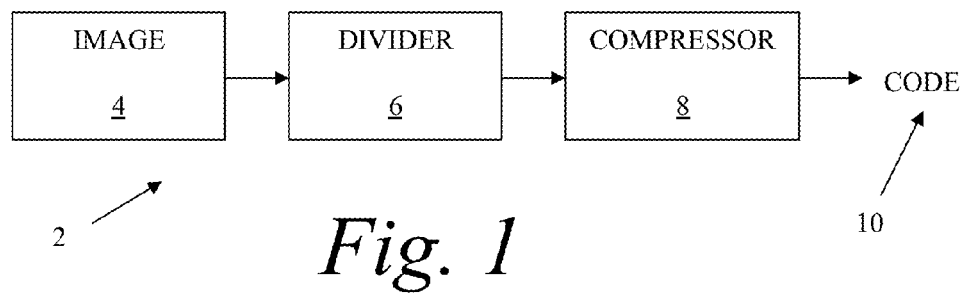
*Fig. 1*
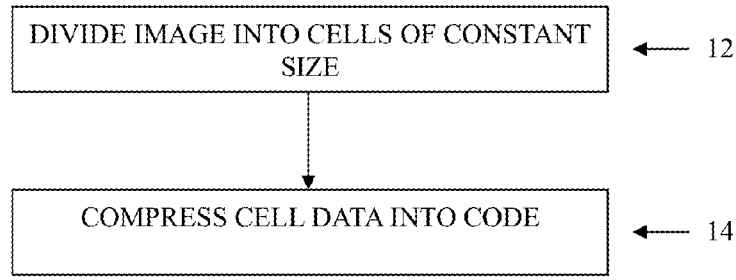
*Fig. 2*
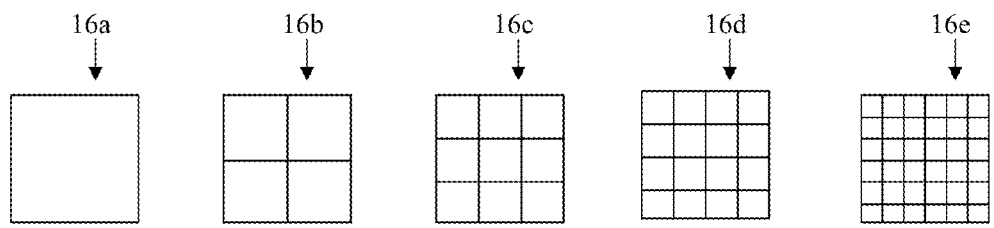
*Fig. 3a*  *Fig. 3b*  *Fig. 3c*  *Fig. 3d*  *Fig. 3e*

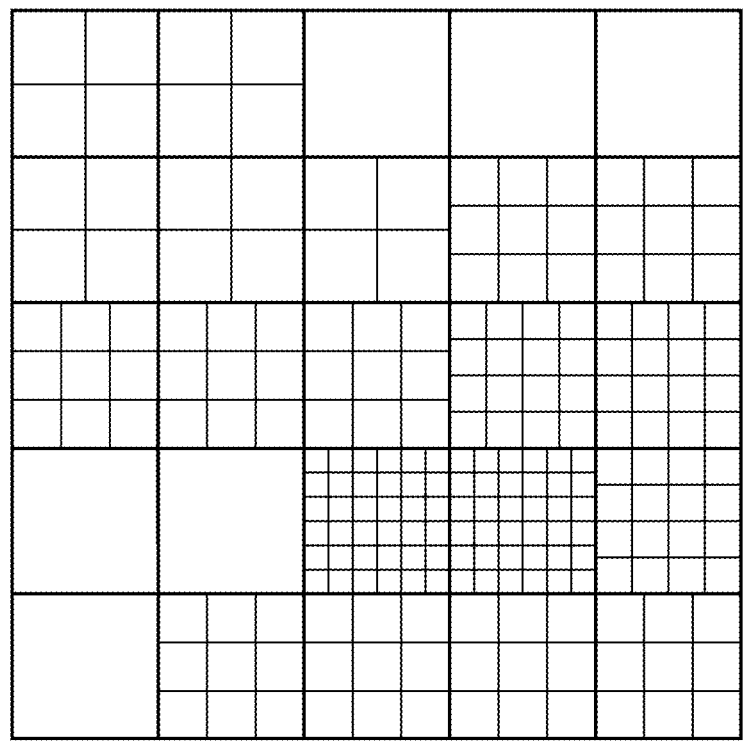
*Fig. 4*

COMPRESSING IMAGE DATA

RELATED APPLICATIONS

The present patent application is a continuation of the pending patent application Ser. No. 11/492,447, filed on Jul. 25, 2006.

BACKGROUND

In many application environments, an image is compressed (or encoded) to reduce the total amount of data needed to represent the image. The compressed data may then be stored or transmitted more efficiently than the original uncompressed image data.

Block truncation coding (BTC) is a common lossy image encoding technique. BTC is a simple and fast compression method and therefore is useful in printing applications. The BTC technique quantises blocks of pixels in an image in a way that preserves the first and second moments of pixel values in the block (i.e., the mean of values and the mean of squares of values in the quantised blocks are the same as in the original blocks). In accordance with the BTC technique, a greyscale image is divided into square blocks of m pixels. The pixels of a given block with values smaller than the mean pixel value for the given block are segmented into a light pixel group and the pixels with values greater than or equal to the mean pixel value are segmented into a dark pixel group. Two quantisation levels a, b are computed for the given pixel as follows:

$$a = x - \sigma \sqrt{q/(m-q)} \quad (1)$$

$$b = x + \sigma \sqrt{(m-q)/q} \quad (2)$$

where x is the mean of the pixel values in the block, $\sigma$ is the standard deviation of the pixel values in the block, and q is the number of pixels in the light pixel group. The pixel values in the light pixel group are mapped to a, and the pixel values in the dark pixel group are mapped to b. Each block is encoded as (x, $\sigma$, B), where B is a binary vector of length m referred to as a mask (also called a bit plane or a bit map). The mask B indicates which pixel locations in a block are assigned to the light pixel group and which pixel locations are assigned to the dark pixel group. During decoding, the quantisation levels a and b of each block are computed from the values x and $\sigma$ in the encoded data using equations (1) and (2), and every pixel in the decoded image is assigned one of the quantisation levels in accordance with the mask B.

By representing each block of pixels by first and second moment values and, optionally, a mask, the BTC method achieves a significant compression of the original image data. Additional compression of the image data may be achieved by encoding the BTC quantisation data using, for example, run-length coding and variable length coding techniques.

According to an aspect of the invention there is provided a method of decoding (decompressing) cell data comprising forming cells of a constant physical size from the cell data regardless of the resolution of an image to be formed from the cell data.

Other aspects of the invention are as outlined in the claims.

If an aspect of the invention is claimed or described in a particular manifestation (eg as apparatus, method, system, software etc) then it is not intended to be limited to this manifestation. The skilled person will understand that, for example, what is claimed as a method is equally inventive when expressed as apparatus or perhaps software arranged to carry out the method (for example when the software is provided on a data carrier).

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments described in detail below may be incorporated into any compression method that involves dividing an image into cells prior to compression. When incorporated in block truncation coding (BTC) methods, for example, these embodiments enable image data to be compressed more efficiently than previous approaches.

DRAWINGS

Embodiments of the invention will now be described, by way of example only, with reference to the accompanying drawings in which:

FIG. 1 shows a schematic representation of a compression system according to an embodiment of the invention;

FIG. 2 is a flow chart showing a method of compressing a digital image according to the present invention;

Figure 5:
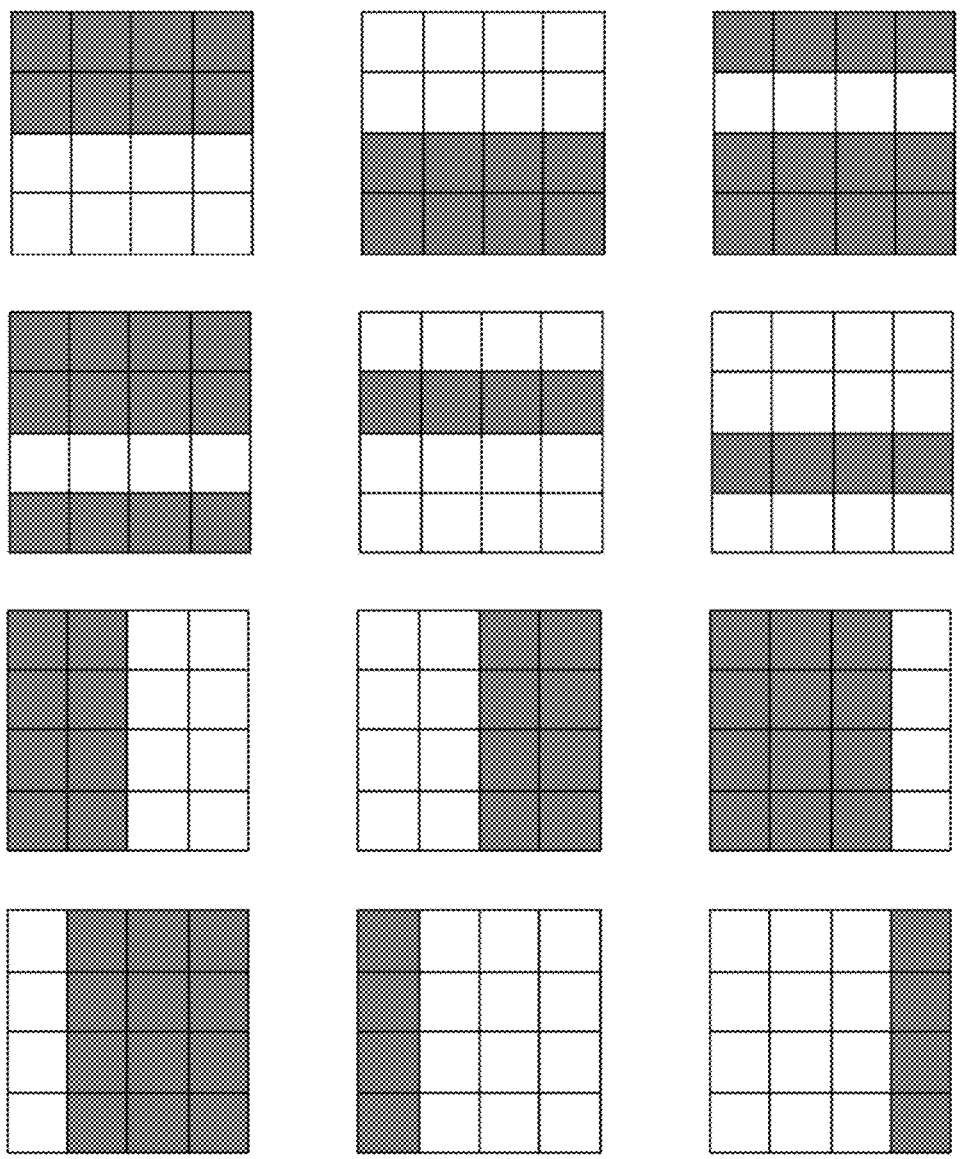
Figure 6:
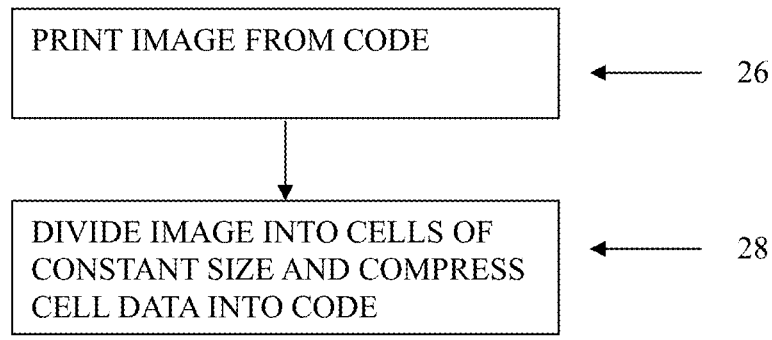
Figure 7:
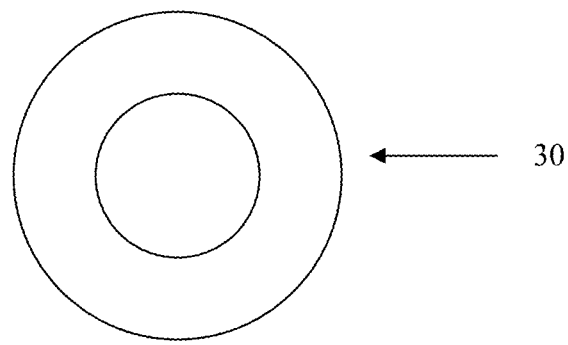

FIGS. 3a to 3e schematically represent cells of constant size containing different numbers of pixels according to the present invention;

FIG. 4 schematically represents a multiple resolution image after it has been passed through a divider according to the present invention;

FIG. 5 schematically represents a library of common edges for use in a compressing step of an embodiment of the invention for edges which are originally at 800 dpi resolution;

FIG. 6 is a flowchart showing a process of printing a digital image according to an embodiment of the invention; and FIG. 7 schematically represents a data carrier carrying software which when run on a processor is arranged to carry out a compression method according to an embodiment of the invention.

FIG. 1 shows an embodiment of a system 2 for compressing (encoding) an image 4. The image compression system 2 includes a divider 6 and a compressor (encoder) 8. The image 4 may correspond to a complete original image or only a portion (e.g. a block) of an original image. The original image may correspond to any type of image, including an image that was captured by an image sensor (e.g. a video camera, a still image or an optical scanner) or a processed (e.g. filtered, reformatted, enhanced or otherwise modified) version of such an original image. The image 4 also may correspond to a complete or partial version of one of multiple colour layers used to represent an original image. The image encoding system 2 is not limited to any particular hardware or software configuration, but rather it may be implemented in any computing or processing environment, including in digital electronic circuitry or in computer hardware, firmware, device driver or software. In some embodiments, the image compression system 2 may be embedded in the hardware of any one of a variety of digital and analogue electronic devices, including desktop and workstation computers, digital still image cameras, digital video cameras, printers, scanners and portable electronic devices (e.g. mobile phones, laptop and notebook computers, and personal digital assistance).

When the divider 6 receives the image 4 it is arranged to divide the image 4 into cells having a constant physical size regardless of the resolution of the image 4. In some embodiments the resolution of the image 4 may be 200 dpi, 400 dpi, 600 dpi, 800 dpi, 1200 dpi, 2400 dpi or any other resolution. Once the divider 6 has divided the image into constant sized cells (e.g. in some embodiments 125 μm×125 μm square cells) the compressor 8 is arranged to analyse the content of each cell and produce cell data which is subsequently compressed into code 10 which represents the image 4. In other embodiments the divider will divide the image into rectangular cells of a constant size. In yet further embodiments the divider divides the image into constant-sized cells of a different, suitable shape.

Advantageously, by dividing the image into cells having a constant size, the compression process is made more efficient. The system 2 is able to receive images of different resolutions and compress them. The present invention also makes reconstruction of the image from the code 10 easier since the code 10 describes constant sized cells. This is an advantage for example when an image is required to be reconstructed and fitted to a rectangular page for printing. The constant cell size provides additional advantages when constructing a page using images of different data types where each image is rendered at a different resolution. It will be apparent that the above-mentioned advantages will be provided in a number of applications in which data of different resolutions is combined. Decompression of the data (due to the constant cell size) is also facilitated. In this exemplary application, the invention is particularly advantageous when the image 4 to be compressed comprises areas, portions or sections having different resolutions—the divider 6 treats them all in the same manner and divides them into constant sized cells. (In this scenario, the cells will contain different numbers of pixels at this stage.) Advantageously, the system 2 can therefore be implemented in hardware or software (e.g. printers, scanners, etc) which has the ability to support the processing of images having multiple resolutions within an image. Also advantageously, the code 10 when reconstructed to form an image will provide an image which maintains substantially the same image quality and image data size regardless of the original resolution of the image 4.

Referring to FIG. 2, according to an embodiment of the invention, at step 12 an image is divided into cells of constant size and at step 14 cell data associated with each cell is compressed into code. Referring to FIGS. 3a to 3e, in a further embodiment of the invention, the divider 6 splits up an image to be compressed into cells having a constant physical size of 125 μm×125 μm. Depending upon the input resolution of the image (or part of the image) from which each cell is taken, that particular cell will include a corresponding number of pixels. For example, FIG. 3a shows schematically a cell 16a (of physical size 125 μm×125 μm) which contains data at a resolution of 200 dpi. Therefore the cell 16a comprises 1 pixel. FIG. 3b shows a cell 16b which is made up of image data at 400 dpi resolution—therefore this cell contains 4 pixels. Similarly FIGS. 3c to 3e show cells 16c to 16e respectively which are made up of image data at resolutions of 600 dpi, 800 dpi and 1200 dpi respectively—these cells therefore contain 9, 16 and 36 pixels respectively.

FIG. 4 schematically represents an image comprising different data types that was divided into a multiple resolution image 18 after it has been passed through the divider 6. The divider 6 has processed the multiple resolution image 18 by dividing it into cells of constant size (in this embodiment, 125 μm×125 μm). Different cells of the image 18 contain different numbers of pixels since (at the input) different regions of the image contained different data types which are best processed at different resolutions (according to workflow and context). Examples of different data types include black and white graphics or text, coloured graphics or text, photographic images, constant background colour etc. The multiple resolution image 18 is then able to be compressed into code which can easily be reconstructed, for example, to form an image suitable for printing on a rectangular page. This is an advantage of many embodiments of the present invention. In contrast, if the divider did not divide the image into cells of a constant size (eg 125 μm×125 μm) but instead divided the original image into cells of a constant pixel area (e.g. 2 pixels×2 pixels, 4 pixels×4 pixels, 8 pixels×8 pixels, etc) regardless of size then it would take more processing power to reconstruct the code into an image on a page to be printed for example. The present invention optimizes the image rendering time according the image type.

Another advantage of dividing the original image into cells having a constant physical size is that certain further steps of the compression process are made more efficient and these are described in more detail below.

The compressor 8, in some embodiments, encodes the image 4 into the code 10 as follows. Firstly the image 4 is divided into constant sized cells. The cells are grouped into elements which comprise a rectangular array of cells. A page is generally composed out of such rectangular elements. According to this embodiment each of the elements that composes the page can have single or mixed resolutions. Some elements have an element header which includes framework data relating to the element such as width and length of the element, element resolution(s), element data size etc. In some embodiments the original resolution of the part of the original image represented by an element is represented by a tag, which forms part of the element. The tag may be provided in the element header in some embodiments.

Following the header the image data is compressed in scan lines. A scan line is a line of cells within an element, where each cell can contain different resolution data. Each individual scan starts with a scan header which can contain data such as the compressed scan size in bytes. Data within each scan line is compressed as described in further detail below or according to standard scan line compression methods.

In one embodiment, a unique compression code for encoding images of multiple resolutions (in this embodiment 400 dpi, 600 dpi, 800 dpi and 1200 dpi) is provided for each compressed data type (resolution). The compression information is held in the scan line information of each element.

When the compressor analyses the cell data, it can be compressed from data at the original resolution into code according to known compression formats. In this embodiment one of the steps in the compression process involves identifying whether a particular cell contains continuous tone, linework or edge data or a combination of these. A subsequent step is translating continuous tone data into code. Another step involves identifying edges between continuous tone levels within a cell area and correctly and efficiently coding such edges.

It is known (for example, from PCT publication number WO2006/017405 in the name of Hewlett-Packard Development Company L.P.) to further compress data by identifying an edge and comparing it to an edge in a library of edges so that a particular edge pattern can be referred to by its index value in the library of edges. Advantageously, the compressor of the present invention is able to interrogate libraries of common edges which are different for different original resolutions. In this embodiment there is a different library of common edges for 800 dpi original resolution, 600 dpi original resolution and 400 dpi original resolution. An example of an 800 dpi edge library is provided in FIG. 5. Advantageously, having a plurality of libraries of common edges allows the compression system of the present invention to accurately recreate edges in an image regardless of different original resolutions within different sections of the original image. Systems which rely on having a single resolution input do not comprise different libraries in this way since they do not envisage a scenario in which multiple resolution coding is necessary. Therefore the present invention more accurately and effectively is able to compress multiple resolution data by providing different libraries for interrogation by the compressor depending upon the different input resolutions.

According to an embodiment of the invention, referring to FIG. 6, a method of printing a digital image comprises dividing the image into cells of constant size and compressing the cell data into code at step 26 and then printing the image from the code at step 28.

The present invention may also be used in conjunction with a page composition system such as that disclosed in WO 99/17258 in the name of Indigo NV et al. In such a page composition system a page is divided, by a divider, into bands, where each band is composed of various elements. For each band the elements are composed serially (one after the other). The page composition system comprises a double band buffer which allows one element to be composed whilst simultaneously another element which is already composed can be read and erased. The page composition system is able to compose elements such as images, text etc together to compose a page regardless of the resolution of the elements. The elements are provided in print ready format and retrieved in real time during the printing process to compose the page. Advantageously, the page composition system according to the present invention is able to mix elements with different resolutions and data types and thus form pages efficiently and effectively from input data of different types (at different resolutions).

Processing is facilitated since regardless of the resolution of each element it is split into equally sized cells to produce cell data which is then arranged to form a desired page lay out.

According to a further embodiment of the invention, referring to FIG. 7, a data carrier in the form of a CD 30 carries software which when run on a processor of a machine, such as an image processing machine, a xerographic printing machine or any other digital image encoding machine is arranged to cause the previously described method to be carried out by the machine or by another machine with which the first mentioned machine is able to communicate. It will be apparent to the skilled person that the data carrier may take any other suitable form.

The invention claimed is:

1. A method of compressing a digital image comprising:
    dividing, by a processor of a computing device, the image into cells of constant physical size regardless of resolution of the image to produce cell data for each cell which defines content of the cell, where prior to dividing the image into the cells of constant physical size, the image is a multiple-resolution image such that a first portion of the image is at a first resolution and a second portion of the image is at a second resolution different than the first resolution; and
    compressing the cell data of the cells on a cell-by-cell basis,
    wherein after dividing the image into the cells of constant physical size, a first cell encompasses a first number of pixels of the first portion of the digital image, and a second cell encompasses a second number of pixels of the second portion of the digital image, the first number of pixels being different than the second number of pixels.

2. The method of claim 1, wherein dividing the image into cells comprises dividing the image into substantially square cells.

3. The method of claim 2, wherein the cells have sides of length 125 um.

4. The method of claim 1, further comprising assigning a tag to each cell, wherein the tag performs at least one of the following:
    identification of the resolution of the part of the original image within the cell;
    identification of different resolutions of the part of the image within the cell;
    identification of the fact that the resolution of the part of the original image within the cell is unknown.

5. The method of claim 1, wherein compressing the cell data comprises comparing the cell data with indexed data stored in a library chosen from a plurality of libraries, the library being chosen dependent upon the resolution of the image.

6. An image processor comprising:
    a divider to divide an image into cells of constant physical size regardless of resolution of the image to produce cell data for each cell which defines content of the cell, where prior to dividing the image into the cells of constant physical size, the image is a multiple-resolution image such that a first portion of the image is at a first resolution and a second portion of the image is at a second resolution different than the first resolution; and,
    a compressor to compress the cell data of the cells on a cell-by-cell basis,
    wherein after dividing the image into the cells of constant physical size, a first cell encompasses a first number of pixels of the first portion of the digital image, and a second cell encompasses a second number of pixels of the second portion of the digital image, the first number of pixels being different than the second number of pixels.

7. The image processor of claim 6, wherein the divider is to divide the image into substantially square cells.

8. The image processor of claim 7, wherein the cells have sides of length 125 μm.

9. The image processor of claim 6, further comprising an assignor to assign a tag to each cell, wherein the tag performs at least one of the following:
    identification of the resolution of the part of the original image within the cell;
    identification of different resolutions of the part of the image within the cell;
    identification of the fact that the resolution of the part of the original image within the cell is unknown.

10. The image processor of claim 6, wherein the compressor is to compare the cell data with indexed data stored in a library chosen from a plurality of libraries, the library being chosen dependent upon the resolution of the image.

11. A non-transitory computer readable medium storing computer-executable code executable by a processor to perform a method comprising:

dividing an image into cells of constant physical size regardless of resolution of the image to produce cell data for each cell which defines content of the cell, where prior to dividing the image into the cells of constant physical size, the image is a multiple-resolution image such that a first portion of the image is at a first resolution and a second portion of the image is at a second resolution different than the first resolution; and compressing the cell data of the cells on a cell-by-cell basis, wherein after dividing the image into the cells of constant physical size, a first cell encompasses a first number of pixels of the first portion of the digital image, and a second cell encompasses a second number of pixels of the second portion of the digital image, the first number of pixels being different than the second number of pixels.

12. The non-transitory computer readable medium of claim 11, wherein dividing the image into cells comprises dividing the image into substantially square cells.

13. The non-transitory computer readable medium of claim 12, wherein the cells have sides of length 125 µm.

14. The non-transitory computer readable medium of claim 11, wherein the method further comprises assigning a tag to each cell, wherein the tag performs at least one of the following:

identification of resolution of the part of the original image within the cell;

identification of different resolutions of the part of the image within the cell;

identification of the fact that the resolution of the part of the original image within the cell is unknown.

15. The non-transitory computer readable medium of claim 11, wherein compressing the cell data comprises comparing the cell data with indexed data stored in a library chosen from a plurality of libraries, the library being chosen dependent upon the resolution of the image.

\* \* \* \* \*

UNITED STATES PATENT AND TRADEMARK OFFICE
CERTIFICATE OF CORRECTION

PATENT NO.       : 9,781,419 B2
APPLICATION NO.  : 14/853573
DATED            : October 3, 2017
INVENTOR(S)      : Amir et al.

It is certified that error appears in the above-identified patent and that said Letters Patent is hereby corrected as shown below:

On the Title Page

In Column 1, Item (72), Inventors, delete "Gideon Amir" and insert -- Gidi Amir --, therefor.

In Column 1, Item (72), Inventors Address, delete "Nes Ziona" and insert -- Kiryat Weizmann Rehovot --, therefor.

In the Claims

In Column 6, Line 21, in Claim 3, delete "um" and insert -- μm --, therefor.

Signed and Sealed this
Eighth Day of May, 2018

Andrei Iancu
*Director of the United States Patent and Trademark Office*